United States Patent Office 3,491,099
Patented Jan. 20, 1970

3,491,099
POLYMETHYLENE-BIS-ISOQUINOLINIUM COMPOUNDS
Frederick Charles Copp, 183–193 Euston Road, London NW. 1, England
No Drawing. Continuation-in-part of application Ser. No. 593,639, Nov. 14, 1966. This application Mar. 20, 1969, Ser. No. 809,007
Claims priority, application Great Britain, Nov. 15, 1965, 48,507/65
Int. Cl. C07d *35/34;* A61k *27/00*
U.S. Cl. 260—286
17 Claims

ABSTRACT OF THE DISCLOSURE

The compounds are of the class of mono- to nona-methylene bis-dihydroisoquinolium and bis-tetrahydro-isoquinolium salts of pharmaceutically acceptable acid anions containing gem-dialkyl substituents on carbon atom 3 or 4 of the heterocyclic nucleus. They are useful as "short-acting" neuromuscular blocking agents.

---

This application is a continuation-in-part of United States application Ser. No. 593,639 filed Nov. 14, 1966, and now abandoned.

The present invention relates to chemical compounds with useful biological properties.

More particularly it relates to a series of isoquinoline derivatives having pharmacological properties which make them useful as neuromuscular blocking agents, or as they are often called "muscle relaxants." Such compounds produce a paralysis of voluntary muscles, which is widely used during major surgical operations.

Before going into details of the compounds of this invention and their activity, a brief description of the processes of neuromuscular transmission and the blocking thereof will help to clarify the invention.

In simplified terms, an impulse is transmitted down a motor nerve fibre until it reaches the synapse betweeen a nerve ending and the corresponding muscle. The impulse then crosses the synapse by means of a process termed neuro-humoral transmission and the muscle momentarily contracts. The basis of neuro-humoral transmission is believed to depend on the following factors: the end plates of the muscle comprise cell membranes which, when the muscle is in the relaxed or normal state, are charged or polarized by having ions adjacent or attached thereto. This membrane potential is caused by the existence of different concentrations of ions such as sodium and potassium ions on either side of the membrane, and is maintained because the membrane is not permeable to all of the ions. When an impulse travelling along the nerve fibre reaches the synapse, a chemical effector, acetylcholine, is released which has the power of altering the permeability of the muscle and plate membrane so that ions can cross it. The ensuing passage of ions causes the membrane to become depolarized, and the consequent change in electric potential, causes the muscle to contract. Very rapidly after the acetylcholine has been released, and has caused the muscle to be activated, an enzyme, cholinesterase, acts on the acetylcholine and causes it to be hydrolysed to choline and an acetate. In the absence of acetyl choline, the membrane quickly reverts to its original state of being non-conducting and it becomes re-polarized, the muscle relaxes again, whilst further chemical reactions cause the choline and the acetate to be resynthesised into the chemically-bound-up and non-activating form of acetylcholine. This whole process is extremely rapid so that it can be repeated when a new impulse is passed down the nerve. A constant series of nerve impulses and appropriate muscle contractions are needed to maintain normal voluntary muscle processes.

A number of compounds are known which interfere with the neuro-humoral transmission processes, some of which act by inhibiting or reducing the depolarization of the muscle end plate where as others act by producing a prolonged depolarization. Other compounds acting at the same general site have different and possibly more complicated actions.

Amongst the former type which inhibit depolarization are d-tubocurarine and gallamine. This type of neuro-muscular blocking agent has also been referred to as the competitive type because it is thought that these substances compete with acetylcholine at the trigger site of the muscle end plate and prevent it from causing the depolarization. The overall effect of the competitive action is that the muscle remains in the relaxed state and a flaccid paralysis occurs. Both d-tubocurarine and gallamine give rise to fairly long term paralysis and recovery is invariably slow. Salts of neostigmine, edrophonium and physostigmine can be used to reduce the effect of d-tubocurarine and gallamine and can be used as antidotes therefor. However their use may introduce undesirable complications and so they should only be used when excessive paralysis is evident.

The second type of blocking agents, which act by producing a prolonged depolarization, include suxamethioium, (also called succinylcholine) decamethonium and hexabiscarbocholine. These are often referred to as "non-competitive" agents, implying that they do not prevent an acetylcholine-like effect from occurring. During depolarization by these agents the muscle end-plate becomes electrically inexcitable. Thus the first effect of the depolarising agents on some muscles is that the muscle contracts as if acetylcholine had caused the depolarization. However, these blocking agents persist at the neuromuscular junction much longer than acetylcholine with the result that re-polarization is delayed and as a result the neuro-humoral transmission cycle is interrupted and paralysis results. The muscle gradually relaxes when no more impulses reach it and the overall effect in these muscles is a spastic paralysis followed by relaxation.

Suxamethonium is usually readily hydrolysed by the pseudocholinesterases of the body and so the paralysis it causes is of relatively short duration. However, in an appreciable number of cases, in patients where pseudocholinesterase levels are low, suxamethonium can unexpectedly give rise to prolonged paralysis and prolonged apnoea.

A further and serious disadvantage with the non-competitive agents, and particularly with suxamethonium, is that muscle strains and cramps may occur; this is probably due to the initial muscle contractions giving rise to muscle imbalance.

Of the art which applicant is aware of, a patent was granted to Eastland et al. as U.S. Patent No. 2,662,083, which discloses structurally different compounds having curarising properties, but not having the selective short-duration property of the compounds claimed in this application. One of the compounds in U.S. Patent No. 2,662,083, where $n$ is 10 and X is methyl (also known as "laudexium") is discussed by J. B. Stenlake (1963) in "Progress in Medicinal Chemistry," vol. 3 (editors G. P. Ellis and G. B. West), p. 30, Butterworths, London. Laudexium is said in the article noted above to be probably the most useful of these (Eastland) compounds and it is stated to have a long duration of action and that cases of recurarisation have been reported.

Another pertinent U.S. patent is 2,744,901 issued to Nabenhauer which disclosed bis-tetrahydroisoquinolines which are not gem dialkyl at either the 3 or 4 positions, are not quaternized, and do not possess the short duration neuromuscular blocking activity of the compounds of this invention.

The compounds of Patent No. 2,744,901 have been discussed in Smith, Pelikan, Mercumba, and Unna, J. Pharm. Exp. Ther., 1953, pp. 108, 317. On page 323 of this article it is stated that "8A (Example 4 of the U.S. Patent 2,744,901) was the most potent neuromuscular blocking agent of the bis-iso-quinolinium derivatives (Table 3) and that the duration of the neuromuscular block was slightly less than that obtained with equipotent doses of tubocurarine."

In view of the above it would be advantageous therefore to provide a series of neuromuscular blocking agents which would combine some of the advantages of the known agents of each type without having all of the disadvantages.

The present invention provides a series of compounds which produce a neuromuscular blocking action apparently by a competitive (nondepolarizing mechanism) and give rise to a paralysis which is of shorter duration than that of d-tubocurarine and gallamine; the severity and persistence of the cardiovascular and autonomic effects are less than those of d-tubocurarine or gallamine.

The compounds are of Formula I below:

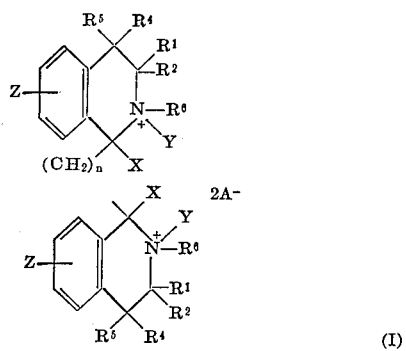

(I)

wherein $R^1$, $R^2$, $R^4$ and $R^5$ are each lower alkyl (1–4 carbon atoms) preferably (methyl or ethyl) or hydrogen provided that $R^1$ and $R^2$ are both lower alkyl whenever $R^4$ or $R^5$ is hydrogen and provided that $R^4$ and $R^5$ are both lower alkyl whenever $R^1$ or $R^2$ is hydrogen, or $R^1$ and $R^2$ together with the carbon atom to which they are attached form a 1,1-divalent cycloalkane group, or $R^4$ and $R^5$ together with the carbon atom to which they are attached form a 1,1-divalent cycloalkane group, $R^6$ is a saturated or unsaturated hydrocarbon radical containing 1 to 4 carbon atoms, $n$ is an integer from 3 to 9, X is a hydrogen atom or an alkyl group and Y is an alkyl group, or an additional chemical bond is formed between C(1) and N(2) in the absence of both X and Y, and Z is selected from the class consisting of one or two lower alkoxy substituents linked to the fused benzene ring, a methylenedioxy group linked to the ring in the 6 to 7 positions, and an ethylenedioxy group linked to said ring in the 6 and 7 positions; the said alkyl and alkoxy groups each have from 1 to 4 carbon atoms. $A^-$ is an anion and its exact identity is not critical for the action of compounds of Formula I. $A^-$ should, however, be a pharmacologically acceptable anion such as chloride, bromide, iodide, sulphate, methosulphate, ethosulphate or p-toluene sulphonate.

The compounds of the present invention can be prepared by quaternizing the corresponding tertiary base of Formula II.

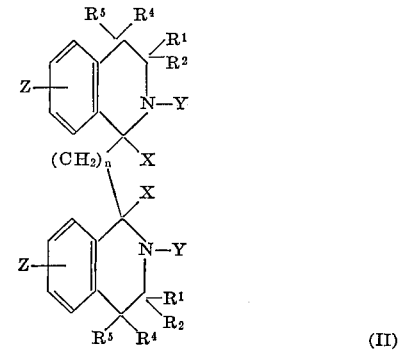

(II)

wherein $n$, $R^1$, $R^2$, $R^4$, $R^5$, X, Y and Z are as defined above, with a reactive ester derivative of an alcohol $R^6OH$, wherein $R^6$ is defined as above, such as the halide, p-toluenesulphonate, or sulphate, preferably in a suitable solvent which does not enter into the reaction, such as methanol or methyl ethyl ketone. If the reactive ester derivative is denoted as $R^6Q$, Q is preferably chosen as a group which will provide a suitable pharmaceutically acceptable anion in the compound of Formula I, but if a different group is used this may be changed by simple metathesis methods such as double decomposition in aqueous solution or an ion exchange column or equivalent methods which are well known in the art.

The intermediate compounds of Formula II wherein $R^4$ and $R^5$ are both hydrogen atoms, one of the Z groups is an alkoxy group in the 6-position, and an additional chemical bond is formed between C(1) and N(2) in the absence of both X and Y, i.e., compounds of Formula III below, may be prepared by applying the conditions of the Ritter reaction, which has been described in J. Amer. Chem. Soc., 1952, 74, 763 and J. Amer. Chem. Soc., 1949, 71, 4128, to appropriate compounds. Thus, two molecular proportions of the appropriate substituted benzyl dialkyl-carbinol or the corresponding 1,1-dialkyl-2-benzyl-ethylene are reacted with the appropriate α,ω-dicyano-alkane according to the reaction scheme:

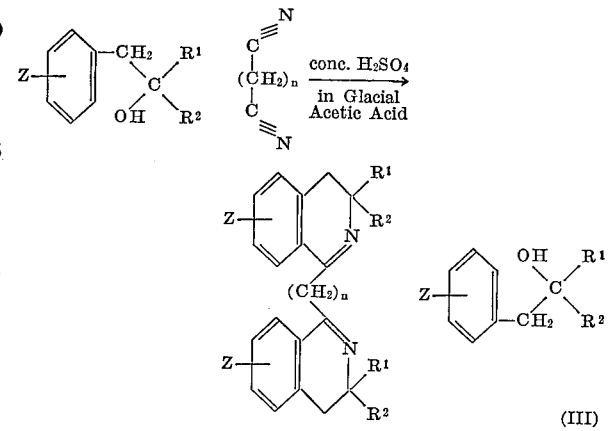

(III)

It is necessary to separate the tertiary amine of Formula III from other end products which are produced as impurities. This can be done by separating the amine in the form of its bis (hydrogen oxalate) or some other suitable salt such as the bis (sulphate) or bis (perchlorate) and then regenerating the base.

The intermediate compounds of Formula II wherein an additional chemical bond is formed between C(1) and N(2) in the absence of both X and Y, i.e., compounds of Formula IV below, may be prepared by applying the conditions of the Bischler-Napieralski reaction, which has been described in Org. Reactions, 1951, 6, 75, to appropriate compounds. Thus, a compound of Formula V, when treated with phosphorus oxychloride, gives a compound of Formula IV according to the reaction scheme:

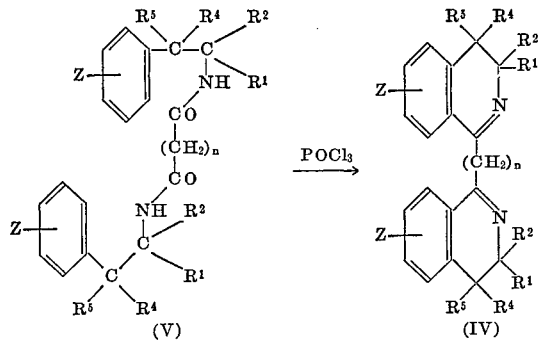

The intermediate compounds of Formula II wherein X is a hydrogen atom and Y is an alkyl group, i.e., compounds of Formula VI below, may be prepared by the catalytic hydrogenation of compounds of Formula VII, according to the reaction scheme:

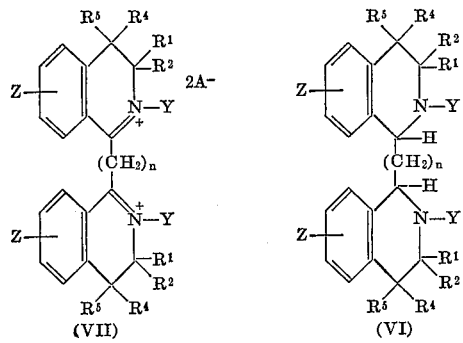

The compounds of Formula VII fall within the scope of compounds of Formula I.

A suitable catalyst for this reaction is platinum oxide (Adam's catalyst).

The intermediate compounds of Formula II wherein both X and Y are alkyl groups may be prepared by the action of an appropriate alkyl magnesium halide, wherein the alkyl group is the desired X group, on a compound of Formula VII.

The preferred compounds of Formula I are those wherein X and Y are absent and an additional chemical bond is formed between C(1) and N(2), $R^1$ and $R^2$ are both methyl groups, $R^4$ and $R^5$ are both hydrogen atoms, $R^6$ is a methyl or ethyl group, $n$ is 4, 8 or 9 and Z is a 6,7-methylenedioxy group, a 6-methoxy group or 5,6-dimethoxy group or 5,6-dimethoxy. Compounds where $n$ is 8 have shown the highest activity.

Particularly preferred compounds of Formula I are those of the following cations:

[252C64]* 1,8-bis-(6-methoxy-2,3,3-trimethyl-3,4-dihydroisoquinol-1-ylium)-octane,

[686C64] 1,8-bis-(5,6-dimethoxy-2,3,3-trimethyl-3,4-dihydroisoquinol-1-ylium)-octane,

[641C64] 1,8-bis-(6-ethoxy-2,3,3-trimethyl-3,4-dihydroisoquinol-1-ylium)-octane,

[636C64] 1,4-bis-(6-methoxy-2,3,3-trimethyl-3,4-dihydroisoquinol-1-ylium)butane,

[819C64] 1,9-bis-(6-methoxy-2,3,3-trimethyl-3,4-dihydroisoquinol-1-ylium)nonane,

[25C65] 1,8-bis-(6,7-dimethoxy-2,3,3-trimethyl-3,4-dihydroisoquinol-1-ylium)octane,

[40C65] 1,8-bis-(3,3-diethyl-6-methoxy-3-methyl-3,4-dihydroisoquinol-1-ylium)octane,

[403C65]* 1,8-bis-(6,7-methylenedioxy-2,3,3-trimethyl-3,4-dihydroisoquinol-1-ylium)octane, and

[333C66]* 1,8-bis-(2-ethyl-6,7-methylenedioxy-3,3-dimethyl-3,4-dihydroisoquinol-1-ylium)octane.

The bracket C numbers preceding each cation above are reference numbers used for ready identification of the appropriate cation.

Of these particularly preferred compounds, a compound of the 1,8-bis-(6,7-methylenedioxy-2,3,3-trimethyl-3,4-dihydroisoquinol-1-ylium)octane cation is the compound of first choice. A compound of the 1,8-bis-(6-methoxy-2,3,3-trimethyl - 3,4 - dihydroisoquinol-1-ylium)octane cation is also particularly outstanding and these two compounds are used hereinafter under their reference numbers 403C65 and 252C64 respectively, to illustrate the properties of the series.

Table I contains a comparison of the durations of partial neuromuscular blockade caused by 252C64, 403C65, d-tubocurarine and gallamine in gastroonemius muscle/ sciatic nerve preparations of rabbit, cat and monkey.

TABLE I

| Compound | Dose in mg./kg. intravenously (mean) | Animal species and number tested | Neuromuscular blockage | | | Mean time for full recovery (in minutes) |
|---|---|---|---|---|---|---|
| | | | Maximum effect | | | |
| | | | Mean percent paralysis | Mean onset time in minutes | Mean duration in minutes | |
| 252C64* | 0.15 | Rabbit (13) | 84 | 3 | 2 | 5.5 |
| | 0.33 | Cat (7) | 81 | 3 | 1.5 | 7 |
| | 0.53 | Monkey (7) | 81 | 3 | 2.5 | 10 |
| 403C65* | 0.11 | Rabbit (8) | 76 | 1.7 | 1.0 | 7.5 |
| | 0.30 | Cat (1) | 72 | 1.0 | 0.5 | 7 |
| | 0.28 | Monkey (5) | 82 | 2.5 | 1.9 | 13 |
| d-Tubocurarine | 0.35 | Rabbit (2) | 85 | 9 | 3.5 | 26 |
| | 0.17 | Cat (3) | 82 | 5 | 4 | 33 |
| | 0.10 | Monkey (2) | 83 | 5 | 6.5 | 39 |
| Gallamine | 0.53 | Rabbit (4) | 86 | 3.5 | 3 | 15 |
| | 0.90 | Cat (2) | 80 | 4 | 4.5 | 26 |
| | 1.0 | Monkey (3) | 80 | 7 | 4.5 | 23 |

Another comparison of the effects of the compounds is included in Table II in which doses sufficient to cause full neuromuscular paralysis were employed. The table also shows some of the autonomic effects of the compounds. Suppression of the bradycardia and fall in blood pressure in response to vagal stimulation were used as a measure of the effect on the parasympathetic system. Sympathetic depression was detected in rabbit and monkey by examining the pressor response during carotid occlusion, and in cats was detected by contraction of the nictitating membrane in response to sympathetic stimulation.

In the species examined, doses of 252C64 sufficient to cause full neuromuscular paralysis had a slight effect on blood pressure and the responses to pre-ganglionic sympathetic nerve stimulation; a moderate vagolytic effect occurred which was of short persistence. Under the same conditions, doses of 403C65 which caused a similar degree of paralysis had little or no effect upon blood pressure nor the responses to pre-ganglionic sympathetic nerve stimulation; a vagolytic effect occurred which was of short persistence. Similar paralyzing doses of gallamine had a vagolytic effect which was more powerful than that of 252C64, and was probably more powerful than that of 403C65 in the rabbit and cat. 403C65 was more effectively and consistently antagonized by edrophonium than 252C64. d-Tubocurarine, particularly in cats and monkeys, blocked the responses to vagal and sympathetic nerve stimulation and also caused a large fall in blood pressure in the cat.

Table II.—Comparison of autonomic effects at intravenous doses sufficient to cause full neuromuscular paralysis in rabbits, cats and monkeys.

It can be seen from the above tables that the compounds of Formula I as exemplified by 252C64 and 403C65 have the following advantages over the widely used neuromuscular blocking agents.

(1) Their duration of action is fairly short with a rapid recovery.

(2) They are less likely to lower blood pressure, and suppress autonomic functions.

(3) Furthermore their mode of action suggests that they are not likely to cause muscle cramps.

The compounds of Formula I are therefore useful for producing a short duration neuromuscular blockade, and the present invention provides a method of producing such a paralysis in mammals (i.e. dogs or cats) by intravenously injecting a dose of .1 mg./kg. to 1 mg./kg. to the mammal.

TABLE II
Paralysis

| Compound | Animal species and number tested | Dose, mg./kg. intravenously (mean) | Mean duration in minutes | Mean recovery time in minutes | Vagal block | Sympathetic block | Blood pressure reduction |
|---|---|---|---|---|---|---|---|
| d-Tubocurarine | Rabbit (3) | 0.37 | 16 | 41 | 60 | 100 | 100 |
|  | Cat (1) | 0.25 | >40 |  | 0 | 0 | 33 |
|  | Monkey (1) | 0.25 | 23 | 45 | 0 | 10 | 80 |
| Gallamine | Rabbit (3) | 1.3 | 22 | 36 | 40 | 100 | 100 |
|  | Cat (1) | 2.5 | >30 |  | 0 | 80 | 80 |
|  | Monkey (2) | 1.4 | 27 | 47 | 20 | 70 | 103 |
| 252C64* | Rabbit (17) | 0.22 | 6.5 | 8 | 80 | 100 | 106 |
|  | Cat (4) | 0.72 | 9.5 | 14 | 54 | 78 | 78 |
|  | Monkey (8) | 1.0 | 13 | 13 | 64 | 50 | 84 |
| 403C65* | Rabbit (4) | 0.13 | 2.5 | 9.5 | 86 | 100 | 108 |
|  | Cat (1) | 0.65 | 9 | 10 | 15 | 100 | 100 |
|  | Monkey (3) | 0.40 | 6.4 | 16 | 15 | 100 | 106 |

Table III below compares the curarising activity of some compounds of Formula I with structurally similar known compounds and seems to indicate, quite clearly, that the presence of gem dialkly groups in the 3,3- or 4,4-position substantially raises the curarising potency. The figures were obtained under the conditions employed for the determination of the figures in Tables I and II.

The compounds may be presented in a pharmaceutical formulation for parenteral administration. The formulation may be an aqueous or non-aqueous solution or emulsion in a pharmaceutically acceptable liquid or mixture of liquids, which may contain bacteriostatic agents, antioxidants, buffers, thickening agents, suspending agents or other pharmaceutically acceptable additives. Such formu-

TABLE III

Curarising Action (in Anaesthetised Rabbits) of some Compounds of Formula I ($n=8$, X and Y=Double Bond) compared with lower Homologues which lack a Gem Dialkyl Group

| Compound Number | Z | $R^1$ | $R^2$ | $R_4$ | $R^5$ | $R^6$ | Dose, mg./kg. i.v. | Percent paralysis |
|---|---|---|---|---|---|---|---|---|
| 634C64 | 6-(OMe) | H | H | H | H | Me | 2.5 | 75 |
| 252C64* | 6-(OMe) | Me | Me | H | H | Me | 0.15 | 84 |
|  |  |  |  |  |  |  | 0.22 | 100 |
| 40C65 (8) | 6-(OMe) | Et | Et | H | H | Me | 0.25 | 75 |
|  |  |  |  |  |  |  | 0.30 | 100 |
| 122C66 | 6,7-C$H_2$ (O,O) | H | H | H | H | Me | 0.75 | 75 |
|  |  |  |  |  |  |  | 1.0 | 90 |
| 403C65* | 6,7-C$H_2$ (O,O) | Me | Me | H | H | Me | 0.11 | 76 |
|  |  |  |  |  |  |  | 0.13 | 100 |
| 497C66 (20) | 6,7-C$H_2$ (O,O) | Me | Et | H | H | Me | 0.07 | 75 |
|  |  |  |  |  |  |  | 0.10 | 98 |
| 204C66 | 6,7-C$H_2$ (O,O) | H | H | H | H | Et | 0.40 | 50 |
|  |  |  |  |  |  |  | 0.60 | 95 |
| 333C66* | 6,7-C$H_2$ (O,O) | Me | Me | H | H | Et | 0.03 | 60 |
|  |  |  |  |  |  |  | 0.05 | 90 |
|  |  |  |  |  |  |  | 0.10 | 98 |
| 409C64 | 6,7-(OMe)$_2$ | H | H | H | H | Me | 0.20 | 80 |
|  |  |  |  |  |  |  | 1.0 | 100 |
| 470C66 (23) | 6,7-(OMe)$_2$ | H | H | Me | Me | Me | 0.05 | 65 |
|  |  |  |  |  |  |  | 0.07 | 97 | lations are presented in unit dose forms such as ampoules or disposable injection devices, or in multi-dose forms such as a bottle from which the appropriate dose may be withdrawn. All such formulations should be rendered sterile.

A simple and preferred formulation is a solution of the compound of Formula I in water. This may be prepared by simply dissolving the compound into previously sterilized pure water under aseptic conditions and sterilizing the solution.

The following examples illustrate the invention. Temperatures are in degrees centigrade. The melting points of the compounds of Formula I were all accompanied by decomposition.

Example 1 m-Methoxyphenylacetone (33 g.) was added slowly to a stirred ice-cold solution of methyl magnesium iodide, which had been prepared from magnesium turnings (5.5 g.) and methyl iodide (14 ml.) in dry ether (350 ml.). The resulting solution was heated to reflux for 30 minutes and then cooled in an ice-bath during the gradual addition of 2 N-hydrochloric acid (200 ml.). The ethereal layer was separated from the acid aqueous layer which was re-extracted with ether. The combined ethereal layers were washed with water and aqueous sodium bisulphite solution. The residual ethereal solution was dried over potassium carbonate, filtered and evaporated; the residual oil was distilled in vacuo to give 2-m-methoxybenzylpropan-2-ol, B.P. 131–133°/11 mm. (28.5 g.).

A solution of this alcohol (13 g.) and sebaconitrile (6 g.) in glacial acetic acid (18 ml.) was stirred during the gradual addition of a mixture of glacial acetic acid (9 ml.) and concentrated sulphuric acid (18 ml.). A considerable amount of heat was evolved and the rate of addition was regulated so as to keep the reaction mixture at 50–60°. The resulting mixture was allowed to stand for about 3 hours and then poured on to ice. The non-basic material was removed with ether and excess concentrated ammonia was added to the aqueous residue to precipitate an oil which was collected with ether in the usual way. The resulting crude base (18 g.) was reacted with oxalic acid (12 g.) in ethanol (50 ml.); after cooling, ethyl acetate (20 ml.) was added, which produced a gradual crystallisation of relatively pure 1,8-bis(6-methoxy-3,3-dimethyl-3,4-dihydroisoquinol-1-yl) - octane-di(hydrogen oxalate), M.P. 173–176°. It was completely purified by crystallisation from ethanol and then repeated crystallisation from methanol, M.P. 183–184° (9 g.).

This salt (5.8 g.) was suspended in hot methanol (20 ml.) and excess concentrated aqueous ammonia was added, followed by water (50 ml.). The precipitated oily base was collected with ether in the usual way and heated in vacuo to remove traces of ammonia. The residue was dissolved in ethyl methyl ketone (15 ml.) and methyl iodide (5 ml.) was added. On heating to reflux the desired 1,8 - bis(6-methoxy-2,3,3-trimethyl-3,4-dihydroisoquinol-1-ylium)octane diiodide rapidly separated as pale yellow crystals. After 6 hours, this product was filtered off and dried in vacuo (6.5 g.) (252C64). It was recrystallised until the molecular extinction coefficient in ethanol, at 329 m$\mu$, was constant at 35,920; its M.P. was then 222–223°. The intensity of absorption was almost unchanged in ethanolic hydrogen chloride (0.1 N), $\epsilon$ mol. 35,600, $\lambda$ max. m$\mu$ Example 2

By the methods described in Example 1, 2-m-methoxybenzylpropan-2-ol was reacted with adiponitrile in acetic acid solution by the addition of concentrated sulphuric acid in acetic acid solution. There resulted 1,4-bis(6-methoxy-3,3 - dimethyl-3,4-dihydroisoquinol-1-yl) butane di(hydrogen sulphate) which crystallised directly from the reaction mixture. It was collected and recrystallised from methanol, M.P. 261°. Treatment of an aqueous solution of this salt with concentrated ammonia gave the corresponding free base which was isolated with ether as a crystalline solid, M.P. 90–92°. This was reacted with excess methyl iodide in ethyl methyl ketone to give 1,4-bis (6-methoxy-2,3,3-trimethyl-3,4-dihydroisoquinol - 1 - ylium)butane diiodide; this was originally obtained as a trihydrate, M.P. 125–127°; it was resolidified again and melted at 226–227°. Drying at 100° in vacuo gave the anhydrous form, M.P. 226–227° (636C64).

Example 3

By the methods described in Example 1, 2-m-methoxybenzylpropan-2-ol was reacted with nonamethylene dinitrile in acetic acid solution by the addition of a mixture of concentrated sulphuric acid and glacial acetic acid. The resulting crude 1,9 - bis(6 - methoxy-3,3-dimethyl-3,4-dihydroisoquinol-1-yl)nonane was isolated in the usual way and converted into its di(hydrogen oxalate) as an Example 1. This salt was crystallised from isopropanol and ether, M.P. 100–101°. The corresponding free base crystallised, M.P. 72–73°; its reaction with methyl iodide in ethyl methyl ketone afforded 1,9-bis(6-methoxy-2,3,3-trimethyl - 3,4 - dihydroisoquinol-1-ylium)nonane diiodide which was crystallised from ethanol, M.P. 186–188° (819C64).

Example 4

By the methods described in Example 1, 2-m-methoxybenzylpropan-2-ol was reacted with trimethylene dinitrile in acetic acid solution by the addition of a mixture of concentrated sulphuric acid and glacial acetic acid. The resulting crude 1,3-bis(6 - methoxy-3,3-dimethyl-3,4-dihydroisoquinol-1-yl)propane was isolated and converted into its di(hydrogen oxalate) which was crystallised from ethanol and ether, M.P. 223–225°. This corresponding free base was a gum which was reacted with excess methyl iodide in ethyl methyl ketone to give 1,3-bis(6-methoxy - 2,3,3 - trimethyl-3,4-dihydroisoquinol-1-ylium) propane diiodide, which was crystallised from ethanol, M.P. 197° (972C64).

Example 5

A mixture of m-ethoxybenzaldehyde (75 g.), nitroethane (46 g.), toluene (100 ml.) and n-butylamine (10 ml.) was heated to reflux and the water formed during the reaction collected in a Dean-Starke trap. After 12 hours the toluene was removed under reduced pressure and the residue distilled in vacuo. 1-m-ethoxyphenyl-2-nitroprop-1-ene resulted as a yellow oil, B.P. 95–110°/ 0.1 mm., which was subsequently crystallised from methanol at $-40°$ and then dried in vacuo, M.P. 35° (72 g.).

A mixture of this solid (2 g.), iron powder (60 g.), ferric chloride (2.4 g.), ethanol (300 ml.) and water (720 ml.) was stirred and heated to reflux concentrated hydrochloric acid (30 ml.) was then slowly added over a period of 1½ hours. The final mixture was stirred and heated at reflux for 2½ hours and distilled in steam. The distillate was saturated with salt and extracted three times with ether to give m-ethoxyphenylacetone, B.P. 146–148° at 12 mm. (Yield 25 g.) This ketone was reacted with excess methyl magnesium iodide in ether to give 2-m-ethoxybenzylpropan-2-ol, B.P. 172–176°/25 mm.

By processes analogous to those described in Example 1, a solution of this alcohol and sebaconitrile in glacial acetic acid was treated with a mixture of concentrated sulphuric acid and glacial acetic acid to give 1,8-bis- (6 - ethoxy - 3,3-dimethyl-3,4-dihydroisoquinol-1-yl)octane which was purified as its di(hydrogen oxalate), M.P. 137–139°. The corresponding base was a gum which was reacted with excess methyl iodide in ethyl methyl ketone to give 1,8 - bis-(6-ethoxy-2,3,3-trimethyl-3,4-dihydroisoquinol-1-ylium)octane diiodide, which was crystallised from isopropanol, M.P. 193–194° (641C64).

Example 6

By the processes described in Example 1, 2-m-ethoxybenzylpropan-2-ol was reacted with adiponitrile in glacial acetic solution by the addition of a mixture of concentrated sulphuric acid and glacial acetic acid solution. The resulting 1,4-bis(6 - ethoxy-3,3-dimethyl-3,4-dihydroisoquinol-1-yl)butane was purified as its di(hydrogen oxalate) which crystallised from methanol, M.P. 224–226°. The corresponding free base was a gum which was reacted with excess methyl iodide in ethyl methyl ketone solution to give 1,4-bis-(6-ethoxy - 2,3,3 - trimethyl-3,4-dihydroisoquinol-1-ylium)butane diiodide, M.P. 212–214° (672C64).

Example 7

2,3-dimethoxybenzaldehyde was reacted with nitroethane in toluene solution in the presence of n-butylamine by methods analogous to those described in Example 5 to give 1-(2,3-dimethoxyphenyl)-2-nitroprop-1-ene, M.P. 80–81°. This was then converted into 2,3-dimethoxyphenyl acetone, B.P. 114–116°/0.5 mm. (by methods analogous to those described in Example 5), which was reacted with excess ethereal methyl magnesium iodide to give 2-(2,3-dimethoxybenzyl)propan-2-ol, B.P. 112–116°/0.5 mm.

A solution of this carbinol and sebaconitrile in glacial acetic acid was treated with a mixture of concentrated sulphuric acid and glacial acetic acid as in Example 1, to give 1,8-bis(5,6 - dimethoxy - 3,3-dimethyl-3,4-dihydroisoquinol-1-yl)octane which was purified as its di(hydrogen oxalate), M.P. 130–132°. The parent base was reacted with excess methyl iodide in ethyl methyl ketone to give 1,8-bis - (5,6-dimethoxy-2,3,3-trimethyl-3,4-dihydroisoquinol-1-ylium)octane diiodide, M.P. 237–238° (686C64).

Example 8

A mixture of m-methoxybenzaldehyde (68 g.), 1-nitropropane (45 g.) and n-butylamine (5 ml.) was kept in a stoppered flask at room temperature for thirty days. The mixture was then taken up into benzene (500 ml.) and the water formed during the reaction was removed. The benzene solution was dried over potassium carbonate, filtered and evaporated; the residue was distilled in vacuo to yield 1-m-methoxyphenyl-2-nitrobut-1-ene, B.P. 100–115°/0.15 mm. It crystallised from methanol at −20° as pale yellow crystals, M.P. 45–47° (36 g.).

A mixture of this product (16 g.), iron powder (30 g.), ferric chloride (1.2 g.), ethanol (150 ml.) and water (364 ml.) was stirred and heated to reflux, when concentrated hydrochloric acid (15 ml.) was slowly added over a period of 1 hour. The resulting mixture was then stirred and refluxed for a further 2 hours and then steam-distilled; the distillate was saturated with salt and extracted three times with ether. The resulting 1-m-methoxyphenylbutan-2-one was a liquid, B.P. 158°/12 mm. (12 g.). This ketone was reacted with excess ethereal ethyl magnesium iodide to give 3-m-methoxybenzylpentan-3-ol, B.P. 154–157°/13 mm.

Sebaconitrile (2.75 g.) was added slowly with stirring to a mixture of concentrated sulphuric acid (9 ml.) and glacial acetic acid (9 ml.), the temperature being maintained at 20°; a mixture of 3-m-methoxybenzylpentan-3-ol (6.9 g.) and glacial acetic acid (4 ml.) was then added slowly, with stirring, so as to maintain the temperature at 60°. The final mixture was stirred for 3 hours and then poured on the ice; the insoluble portion was removed with ether and the residual acid solution basified with concentrated aqueous ammonia. The precipitated basic gum was isolated with ether in the usual way and converted into its diperchlorate. The resulting 1,8-bis-(3,3-diethyl-6-methoxy-3,4-dihydroisoquinol-1-yl)octane diperchlorate was purified by precipitation from acetone with ether, M.P. 164–165° (9.5 g.).

A solution of this salt (3.1 g.) in methanol (20 ml.) was treated with excess ammonia and water (50 ml.) added to precipitate the parent base as a gum, which was isolated with ether in the usual way. It was reacted with the excess methyl iodide in ethyl methyl ketone to give 1,8-bis-(3,3-diethyl-6-methoxy - 2 - methyl-3,4-dihydroisoquinol-1-ylium)octane diiodide, which was crystallized from a mixture of ethanol and ethyl acetate, B.P. 187–188° (2.7 g.).

A suspension of this diiodide (2.7 g.) and a large excess of finely divided silver bromide (7 g.) in methanol was stirred and heated to reflux for 5 minutes. It was then filtered and the residual mixture of silver salts washed repeatedly with fresh boiling methanol. The combined filtrate and washings were evaporated in vacuo to give a residue which crystallised on boiling with acetone; the resulting 1,8-bis-(3,3-diethyl - 6-methoxy-2-methyl-3,4-dihydroisoquinol-1-ylium)-octane dibromide was recrystallised from ethanol and ether, M.P. 190–191° (1.3 g) (40C65).

Example 9

3,4-dimethoxyphenyl acetone was reacted with excess ethereal methyl magnesium iodide to give 2-(3,4-dimethoxybenzyl)propan-2-ol, B.P. 118–122°/0.5 mm. Sebaconitrile (3.28 g.) was added to a mixture of glacial acetic acid (20 ml.) and conceentrated sulphuric acid (10 ml.) at 60°. A mixture of the above 2-(3,4-dimethoxybenzyl-propan-2-ol (8.4 g.) was then slowly added with stirring at such a rate as to keep the temperature 50–60°. The mixture was stirred for a further 2 hours and then poured on to iced water and the insoluble portion extracted with ether. The aqueous residue was then basified with excess concentrated ammonia and the precipitated base extracted with chloroform. The resulting 1,8-bis-(6,7-dimethoxy-3,3-dimethyl-3,4-dihydroisoquinol-1-yl)octane was purified as its di(hydrogen oxalate), which was crystallized from methanol, M.P. 140–142°.

The regenerated parent base was reacted with excess methyl iodide in ethyl methyl ketone to give the desired 1,8-bis-(6,7-dimethoxy-2,3,3-trimethyl-3,4-dihydroisoquinol-1-ylium)octane diiodide which was recrystallised from a mixture of isopropanol, ethanol and ethyl acetate, M.P. 215–217° (25C65).

Example 10

A suspension of 1,8-bis-(6-methoxy-2,3,3-trimethyl-3,4-dihydroisoquinol-1-ylium) diiodide (28 g.) and a large excess of finely divided dry silver chloride (40 g.) in methanol (150 ml.) was stirred and heated to reflux for 5 minutes only. The insoluble silver salts were filtered off and washed several times with fresh hot methanol. The combined filtrate and washings were evaporated in vacuo; the residual gum was treated with boiling acetone, when it rapidly crystallised. The suspension was cooled for some hours and the solid then collected, washed with a little fresh dry acetone and dried immediately in vacuo. The resulting 1,8-bis-(6-methoxy-2,3,3-trimethyl-3,4-dihydroisoquinol-1-ylium)octane dichloride was crystallised by gradual precipitation from isopropanol with ethyl acetate; it was obtained as a colourless solid, the M.P. of which varied with the rate of heating, though it was usually in the range of 195–200°.

By reacting 1,8-bis-(6-methoxy-2,3,3-trimethyl-3,4-dihydroisoquinol-1-ylium)octane diiodide with excess silver bromide, as above, there resulted 1,8-bis-(6-methoxy-2,3,3 - trimethyl - 3,4-dihydroisoquinol-1-ylium)octane dibromide, M.P. 203–204° (252C64).

Example 11

Pharmaceutical formulation of Compound 252C64 dichloride.—1,8-bis-(6-methoxy-2,3,3-trimethyl-3,4-dihydroisoquinol-1-ylium)octane dichloride is dissolved in water for injection B.P. to a concentration of 15 mg. per 1 ml. The solution may be sterilised by heating it in an autoclave or by filtration and the solution is then aseptically filled into ampoules using a standard satisfactory procedure.

Example 12

3,4-methylenedioxyphenylacetone (45 g.) was slowly added to a stirred, ice-cooled solution of methyl magnesium iodide which had been prepared from magnesium (12 g.) and methyl iodide (72 g.) in dry ether (400 ml.). The resulting suspension was kept overnight at room temperature and then heated to reflux for 1 hour. After cooling, a solution of ammonium chloride (50 g.) in water (200 ml.) was slowly added in with stirring. When this decomposition was complete, the ether layer was removed and the residual aqueous layer re-extracted with ether. The combined ethereal solutions were washed with water, dried over potassium carbonate, filtered and evaporated. The residue was distilled in vacuo to give 2-(3,4-methylenedioxybenzyl)propan-2-ol, B.P. 120–130°/0.1 mm.

A solution of this carbinol (8.3 g.) in glacial acetic acid (10 ml.) was slowly added to a stirred mixture of sebaconitrile (3.2 g.), glacial acetic acid (20 ml.) and concentrated sulphuric acid (10 ml.) which had been preheated to 50–60°; the addition was performed at such a rate that the reaction temperature was maintained at about 60°. After standing overnight the resulting dark brown solution was poured into water and the resulting suspension was filtered. Addition of excess concentrated ammonia to the filtrate produced a solid precipitate which was collected, washed with water and extracted with ether. The insoluble residue, which was identified as selacamide, was filtered off and the ethereal solution was evaporated; the residue was reacted with a slight excess of perchloric acid in isopropanol to give 1,8-bis-(6,7 - methylenedioxy - 3,3-dimethyl-3,4-dihydroisoquinol-1-yl)octane diperchlorate, which was repeatedly recrystallised from methanol and ether, M.P. 229–230°. This salt (1.8 g.) was suspended in water (20 ml.) and excess concentrated ammonia added to give a gum, which was isolated with ether in the usual way to give a solid, M.P. 142–143°. It was added to a mixture of ethyl methyl ketone (5 ml.) and methyl iodide (5 ml.) and the resulting solution heated to reflux for 1 hour. The resulting solid was filtered off and recrystallised from ethanol containing a little ether to give 1,8-bis(6,7-methylenedioxy - 2,3,3 - trimethyl - 3,4-dihydroisoquinol - 1-ylium) octane diiodide, M.P. 234–235° (403C65).

When the solid was recrystallized from methanol, the resulting product was in the form of yellow crystals, melting at 245°; when the solid was recrystallised from water, the resulting product was nearly colourless and melted at 178–180°. Both of these products appeared to be 1,8 - bis(6,7 - methylenedioxy - 2,3,3-trimethyl-3,4 - dihydroisoquinol - 1 - ylium)octane diiodide containing about 1½ molecules of water of crystallisation.

Example 13

A mixture of 3,4-ethylenedioxybenzaldehyde (68 g.), nitroethane (30 g.), toluene (70 ml.) and butylamine (8 ml.) was heated to reflux for 16 hours and the water formed was collected in a Dean-Starke trap. The toluene was then removed in vacuo to give an oil which crystallised on the addition of methanol (200 ml.) to give 1-6′-benzdioxinyl-2-nitroprop-1-ene, M.P. 86°.

A suspension of this product (44.5 g.) and iron powder (90 g.) in a mixture of ethanol (450 ml.) and water (1 litre) containing ferric chloride (35 g.) was heated to reflux and stirred. Concentrated hydrochloric acid (45 ml.) was then slowly added over a period of ca. 1 hour; the final mixture was filtered and the residue washed thoroughly with ether. The aqueous portion of the filtrate was separated and extracted five times with fresh ether. The combined ethereal extracts were washed once with water, dried over anhydrous potassium carbonate, filtered and evaporated. The residual 1-6′-benzdioxinyl acetone was an oil, B.P. 130–131°/0.04 mm. This ketone was reacted with ethereal methyl magnesium iodide in the usual way to give 2-6′-benzdioxinylmethyl-propan-2-ol, B.P. 120°/0.08 mm.

Using the methods described in Example 9 and Example 12, this carbinol was reacted with sebaconitrile in a mixture of concentrated sulphuric and glacial acetic acids to give 1,8 - bis(6,7 - ethylenedioxy-3,3-dimethyl-3,4-dihydroisoquinol-1-yl)octane; this base was isolated as its diperchlorate which crystallised from methanol and ether, M.P. 252–253°. The regenerated base was reacted with methyl iodide in ethyl methyl ketone to give 1,8-bis (6,7 - ethylenedioxy - 2,3,3 - trimethyl-3,4-dihydroisoquinol-1-ylium)octane diiodide, M.P. 265° (487C65).

Example 14

4-ethoxy-3-methoxyphenyl acetone was reacted with methyl magnesium iodide (as in Example 1) to give 2-(4 - ethoxy - 3-methoxybenzyl)propan-2-ol, as an oil, B.P. 110–115°/0.05 mm., which subsequently solidified. It was then condensed with sebaconitrile in a mixture of concentrated sulphuric acid and glacial acetic acid, using the methods described in Example 9, to give 1,8-bis(7-ethoxy - 6-methoxy - 3,3-dimethyl - 3,4-dihydroisoquinol-1-yl)octane di(hydrogen oxalate) which was crystallised from methanol and ether, M.P. 132–133°. The regenerated base was crystallised from ethyl methyl ketone, M.P. 167–169°. It was reacted with methyl iodide in ethyl methyl ketone to give 1,8-bis-(7-ethoxy-6-methoxy-2,3,3 - trimethyl - 3,4 - dihydroisoquinol - 1 - ylium)octane diiodide, M.P. 201–203° (455C65).

Example 15

3,4 - dimethoxyphenylacetone (38.8 g.) was reacted with ethereal ethyl magnesium iodide (prepared from 68.6 g. ethyl iodide and 9.6 g. magnesium in 300 ml. dry ether). The resulting 2-(3,4 - dimethoxybenzyl) - butan-2-ol was isolated in the usual way as an oil, B.P. 182–186°/15 mm. Reaction with sebaconitrile, by the methods used in Example 9 and Example 12, afforded 1,8-bis-(3-ethyl - 6,7 - dimethoxy-3-methyl - 3,4 - dihydroisoquinol-1-yl)octane which was initially isolated as its dihydrogen oxalate, M.P. 136–138°. The parent base, M.P. 122–124°, was reacted with methyl iodide in ethyl methyl ketone to give 1,8-bis-(3 - ethyl - 6,7 - dimethoxy - 2,3-dimethyl - 3,4 - dihydroisoquinol - 1-ylium)octane diiodide, M.P. 206–208° (644C65).

Example 16

Cyclopentanone (20 g.) was reacted with ethereal m-methoxy-benzyl magnesium chloride (prepared from m-methoxybenzyl chloride (36 g.) and magnesium (6.2 g.) in dry ether (200 ml.)) to give 1-m-methoxybenyl-cyclopentan-1-ol, B.P. 90–98°/0.03 mm. This was reacted with sebaconitrile according to the methods described in Example 1. The crude reaction mixture was poured into water and the neutral insoluble oil removed with ether. The addition of excess perchloric acid to the residual aqueous solution produced an oil which subsequently solidified. This solid, 1-8 - bis-(6 - methoxy-3,3-tetramethylene - 3,4 - dihydroisoquinol-1-yl)octane diperchlorate, was crystallised from ethanol, M.P. 167–170°. The parent base was reacted with methyl iodide in ethyl methyl ketone to give 1,8-bis-(6-methoxy-2-methyl-3,3-tetramethylene-3,4-dihydroisoquinol-1-ylium)octane diiodide, M.P. 179–180° (188C66).

Example 17

A mixture of 1,8 - bis-(6,7-methylenedioxy-3,3-dimethyl - 3,4 - dihydroisoquinol - 1-yl)octane (2.6 g.), ethyl methyl ketone (6 ml.) and diethyl sulphate (2 g.) was heated on a steam bath for 6 hours. After cooling the separated solid was filtered off and recrystallised from a mixture of ethanol and ether to give 1,8-bis-(2-ethyl-6,7-methylene-dioxy - 3,3-dimethyl - 3,4-dihydroisoquinol-1-ylium)octane diethosulphate, M.P. 196–198° (decomp.) (333C66).

Example 18

1,8 - bis-(6 - methoxy-3,3 - dimethyl-3,4-dihydroisoquinol-1-yl)-octane was reacted with diethyl sulphate as in Example 17. The resulting 1,8-bis-(2-ethyl-6-methoxy-3,3 - dimethyl-3,4-dihydroisoquinol-1-ylium) - octane diethosulphate was a gum. Reaction with aqueous potassium iodide afforded corresponding diiodide which was repeatedly crystallised from ethanol and ether, M.P. 185–187° (350C66).

Example 19

Using methods analogous to those described in Example 8, veratraldehyde was reacted with nitropropane to yield 1 - (3,4 - dimethoxyphenyl) - 2 - nitrobut - 1 - ene, M.P. 78°, which was then converted into 1-(3,4-dimethoxyphenyl)butan-2-one, B.P. 174–178°/15 mm., which was reacted with ethyl magnesium iodide to give 3-(3,4-dimethoxybenzyl)pentan-3-ol, B.P. 108–110°/0.15 mm. This carbinol was then reacted with sebaconitrile according to the methods used in Example 9 to give 1,8-bis-(3,3-diethyl - 6,7 - dimethoxy - 3,4 - dihydroisoquinol - 1 - yl)octane, which was reacted with methyl iodide, in ethyl methyl ketone, without any purification. The resulting 1,8 - bis - (3,3 - diethyl - 6,7 - dimethoxy - 2 - methyl - 3,4-dihydroisoquinol-1-ylium)octane diiodide was crystallised from boiling ethanol, M.P. 197–199° (366C65).

Example 20

Using the methods described in Example 8, piperonal was reacted with nitropropane to yield 1-(3,4-methylenedioxyphenyl) - 2 - nitrobut - 1 - ene, M.P. 63–66°; this product was then converted into 1-(3,4-methylenedioxyphenyl)butan-2-one, B.P. 130–134°/0.1 mm., which was reacted with methyl magnesium iodide to yield 2-(3,4-methylenedioxybenzyl)butan-2-ol. Condensation of this carbinol with sebaconitrile, using the conditions described in Example 9 and Example 12, led to 1,8-bis-(3-ethyl-3-methyl - 3,4 - methylenedioxy - 3,4 - dihydroisoquinol-1-yl)octane diperchlorate, which was recrystallised from acetone, M.P. 224–226°. The parent base was reacted with excess methyl iodide in ethyl methyl ketone to give 1,8 - bis - (3 - ethyl - 2,3 - dimethyl - 6,7 - methylenedioxy - 3,4 - dihydroisoquinol - 1 - ylium)octane diiodide; it was crystallised from ethanol, M.P. 215–216° (497C66).

Example 21

A mixture of 1,8-bis-(6-methoxy-3,3-dimethyl-3,4-dihydroisoquinol-1-yl)octane (6.5 g.), acetone (30 ml.) and methyl p-toluenesulphonate (5.2 g.) was heated to reflux for 24 hours and the resulting solution slowly cooled to room temperature to produce 1,8-bis-(6-methoxy-2,3,3-trimethyl - 3,4 - dihydroisoquinol - 1 - ylium)octane di-(p-toluenesulphonate) as a crystalline solid. This was collected and recrystallised from isopropanol, M.P. 105–108° (252C64).

Example 22

A mixture of 1,8-bis-(6-methoxy-3,3-dimethyl-3,4-dihydroisoquinol-1-yl)octane (6.9 g.), dimethyl sulphate (3.6 g.) and ethyl methyl ketone (25 ml.) was heated to reflux for 19 hours. Cooling produced 1,8-bis-(6-methoxy-2,3,3 - trimethyl - 3,4 - dihydroisoquinol - 1 - ylium)octane di-(methosulphate). This was collected and recrystallised from isopropanol M.P. 100–102° (252C64).

Example 23

A suspension of sodium hydride (2.4 g.) in dry dimethylsulphoxide (50 ml.) was warmed at 70° until a clear solution had been formed. This was cooled and stirred during the gradual addition of 3,4-dimethoxyphenylacetonitrile (17.7 g.). The mixture was then warmed back to 50–55° and methyl iodide (14.2 g.) added slowly at such a rate as to maintain the temperature at about 55°. A fresh solution of sodium hydride (2.6 g.) in dry dimethyl sulphoxide (50 ml.) was then added, when the mixture became warm again. Methyl iodide (14.5 g.) was again slowly added at about 55°; finally, a further 1 ml. of methyl iodide was added at 80° to discharge the reddish colour in the reaction mixture. The reaction product—2 - (3,4 - dimethoxyphenyl) - 2 - methylpropionitrile—was isolated by pouring into water and collecting the precipitate with ether in the usual way. The resulting oil was distilled in vacuo, B.P. 110–114°/0.1 mm.

A solution of this oil (15 g.) in dry tetrahydrofuran (20 ml.) was added slowly to a stirred suspension of lithium aluminium hydride (5 g.) in dry tetrahydrofuran (20 ml.) at reflux. The resulting mixture was heated to reflux for 16 hours and then cautiously decomposed at 0° with 5 N sodium hydroxide. The organic layer was decanted off the insoluble sludge, which was re-extracted with fresh ether. The combined ethereal layers were dried, filtered and evaporated and the residual 2-(3,4-dimethoxyphenyl)-2-methylpropylamine was distilled in vacuo B.P. 115°/0.05 mm.

A mixture of this base (10 g.), anhydrous sodium carbonate (10.6 g.) and chloroform (50 ml.) was stirred and sebacoyl chloride (5.8 g.) was slowly added at 50°. After the addition was complete, the mixture was heated to reflux for 2 hours, filtered and evaporated in vacuo to give N,N' - bis - (2 - 3',4' - dimethoxyphenyl - 2 - methylpropyl)sebacamide, which crystallised on grinding with light petroleum (B.P. 40–60°). It was collected and dried in vacuo M.P. 103–104°.

A mixture of this diamide (11 g.) and phosphorus oxychloride (110 ml.) was heated in an oil bath at 110° for 1 hour, when hydrogen chloride was evolved. After 2 hours the mixture was cooled and cautiously decomposed with ice and water to yield a clear solution. This was slowly treated with an excess perchloric acid to produce a crystalline precipitate of 1,8-bis-(6,7-dimethoxy-4,4-dimethyl - 3,4 - dihydroisoquinol - 1 - yl)octane diperchlorate, which was collected, washed with a little water and recrystallised from ethanol, M.P. 184–185°. The regenerated base was recrystallised from light petroleum (B.P. 80–100°) which contained a trace of acetone. On reaction with excess methyl iodide in ethyl methyl ketone it afforded 1,8 - bis - (6,7 - dimethoxy - 2,4,4 - trimethyl-3,4-dihydroisoquinol-1-ylium)octane diiodide, M.P. 244° (470C66).

Example 24

A mixture of 1,8-bis-(6,7dimethoxy-4,4-dimethyl-3,4-dihydroisoquinol-1-yl)octane (1.2 g.), ethyl methyl ketone (7 ml.) and diethylsulphate (0.6 ml.) was heated to reflux on the steam bath. A clear solution resulted which subsequently crystallised. The resulting 1,8-bis-(2-ethyl-6,7 - dimethoxy - 4,4 - dimethyl - 3,4 - dihydroisoquinol-1-ylium)octane diethosulphate was recrystallised from ethanol and ether, M.P. 193–194° (515C66).

Example 25

A mixture of 1,8-bis-(6,7-dimethoxy-4,4-dimethyl-3,4-dihydroisoquinol-1-yl)octane (1.0 g.), ethyl methyl ketone (10 ml.) and allyl bromide (2.0 ml.) was heated to reflux. A crystalline solid rapidly separated. The resulting 1,8 - bis - (2 - allyl - 6,7 - dimethoxy - 4,4 - dimethyl-3,4 - dihydroisoquinol - 1 - ylium)octane dibromide was recrystallised from ethanol and ether, M.P. 208–209° (516C66).

Example 26

A mixture of 1,8 - bis - (6 - methoxy - 2,3,3-trimethyl-3,4 - dihydroisoquinol - 1 - ylium)octane dibromide (5.0 g.), ethanol (150 ml.) and platinum oxide catalyst (Adams' catalyst; 100 mg.) was swirled under hydrogen at atmospheric temperature and pressure in the usual way. There was a rapid uptake of hydrogen which ceased, or became very slow, when two molecular proportions of hydrogen had been absorbed. The solution was filtered to remove the suspended catalyst and the filtrate evaporated in vacuo. The residual gum crystallised on boiling with acetone. The resulting 1,8-bis-(6-methoxy-2,3,3 - trimethyl-1,2,3,4-tetrahydroisoquinol - 1 - yl)octane dihydrobromide was suspended in boiling isopropanol, the cooled suspension filtered, and the residue finally purified by recrystallisation from ethanol and ether, M.P. 210–211°.

The regenerated base was then reacted with excess methyl iodine in boiling ethyl methyl ketone to give 1,8-bis - (6 - methoxy - 2,2,3,3-tetramethyl - 1,2,3,4-tetrahydroisoquinol - 1 - ylium)octane diiodide, which was

17 crystallised from methanol and ether, M.P. 229–230° (674C64).

Example 27

An ice-cold mixture of 1,8-bis-(6,7-methylenedioxy-3,3 - dimethyl - 3,4 - dihydroisoquinol - 1 - yl)octane (125 g.), methyl bromide (200 ml.) and ethyl methyl ketone (300 ml.) was heated in a sealed autoclave at 75° for 3 hours. After cooling, the contents of the autoclave were transferred to a flask and evaporated on a steam bath until the volume was about 250 ml. The mixture was stirred and scratched to induce crystallisation and it was left to stand for 1 hour at 0°. The resulting 1,8-bis-(6,7-methylenedioxy - 2,3,3 - trimethyl - 3,4 - dihydroisoquinol - 1 - ylium)octane dibromide was collected and recrystallised from isopropanol (1800 ml.), M.P. 221–223° (252C64).

Example 28

2-(3,4-methylenedioxyphenyl) - 2 - methylpropionitrile was prepared from 3,4-methylenedioxyphenyl acetonitrile by the methods described in Example 23 and reduced with lithium aluminium hydride to 2 - (3,4-methylenedioxyphenyl) - 2 - methylpropylamine B.P. 100°–110°/0.05 mm. Reaction with sebacoyl chloride afforded N,N'-bis-(2,3',4'-methylenedioxyphenyl - 2 - methylpropyl) sebacamide; this substance was dehydrated with phosphorus oxychloride to yield 1,8-bis-(4.4-dimethyl - 6,7 - methylenedioxy - 3,4 - dihydroisoquinol - 1 - yl) octane which was isolated as its diperchlorate, M.P. 223–234°. The regenerated base was reacted with excess methyl iodide in ethyl methyl ketone to yield 1,8 - bis - (4,4-dimethyl-6,7-methylenedioxy - 3,4 - dihydroisoquinol - 1 - ylium) octane diiodide, M.P. 100°.

Example 29

The methods described in Example 23 were used to effect the following chemical changes: 2,5 - dimethoxyphenylacetonitrile was reacted with methyl iodide and dimsyl sodium in dimethyl sulphoxide to give 2 - (2,5-dimethoxyphenyl) - 2 - methylpropionitrile, B.P. 110°–116°/0.05 mm. Reduction with lithium aluminium hydride then afforded 2 - (2,5 - dimethyoxyphenyl) - 2 - methylpropylamine, B.P. 98–101°/0.1 mm. which reacted with sebacoyl chloride to yield N,N'-bis-(2,2'5' - dimethoxyphenyl - 2 - methylpropyl) sebacamide, M.P. 88–90°.

A solution of the diamide (10.0 g.) in phosphorus oxychloride (50 ml.) was heated in an oil bath for 30 min. at 100° and for 90 min. at 120°. Hydrogen chloride was evolved. The resulting bright yellow solution was decomposed with water in the usual way to give a suspension of a yellow crystallised solid. This suspension was cooled and this solid, 1,8-bis - (5,8-dimethoxy - 4,4-dimethyl-3,4 - dihydroisoquinol - 1 - yl)octane dihydrochloride, was collected. The regenerated base was a colourless solid, M.P. 88–90°. It was reacted with excess methyl iodide in ethyl methyl ketone to give 1,8-bis - (5,8-dimethoxy-2,4,4-trimethyl - 3,4-dihydroisoquinol - 1 - ylium) octane diiodide, M.P. 199–201° (575C66).

Example 30

Pharmaceutical formulation of Compound 403C65 diiodide. 1,8 - bis - (6,7 - methylenedioxy - 2,3,3 - trimethyl-3,4-dihydroisoquinol-l-ylium) octane diiodide is dissolved in water for injection B.P. to a concentration of 40 mg. per 2 ml. The solution may be sterilized by heating it in an autoclave or by filtration and the solution is then aseptically filled into ampoules using a standard satisfactory procedure.

Example 31

Pharmaceutical formulation of Compound 333C66 diethosulphate. A pharmaceutical formulation was prepared in exactly the same manner as described in Example 30.

18

What is claimed is:
1. A compound of the formula

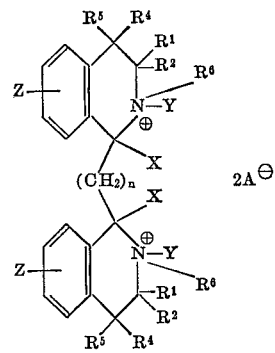

wherein
R¹, R², R⁴ and R⁵ are lower alkyl or hydrogen provided that whenever one or both R⁴ and R⁵ are hydrogen R¹ and R² are both lower alkyl or R¹ and R² taken together with the carbon atom to which they are attached form a 1,1-divalent cyclopentane group; and provided that whenever one or both R¹ and R² are hydrogen, R⁴ and R⁵ are both lower alkyl, R⁶ is selected from the class consisting of lower alkyl and allyl;
n is an integer from 3 to 9;
X and Y taken separately are selected from the class consisting of hydrogen and lower alkyl;
X and Y taken together are replaced by an additional chemical bond between C(1) and N(2);
Z is selected from the class consisting of one or two lower alkoxy substituents linked to the fused benzene ring, a methylenedioxy group linked to said ring in the 6 and 7 positions, and an ethylenedioxy group linked to said ring in the 6 and 7 positions; and A⁻ is a pharmacologically acceptable anion.

2. A compound according to claim 1 in which n is an integer 4, 8 or 9.

3. A compound according to claim 1 in which Z is selected from the class consisting of 5-methoxy, 6-methoxy, and 6,7-methylenedioxy.

4. A compound according to claim 1 in which R⁶ is methyl or ethyl.

5. A compound according to claim 1 in which R¹, R², R⁴ and R⁵ are hydrogen, methyl or ethyl provided that whenever one of R¹ and R² is hydrogen, R⁴ and R⁵ are both methyl or ethyl and provided that whenever one of R⁴ and R⁵ is hydrogen, then R¹ and R² are methyl or ethyl.

6. A compound according to claim 1 wherein A⁻ is selected from the class consisting of chloride, bromide, iodide, sulphate, methosulphate, ethosulphate, and p-toluene-sulphonate.

7. A pharmacologically acceptable salt of the 1,8-bis-(6-methoxy - 2,3,3 - trimethyl - 3,4 - dihydroisoquinol-1-ylium) octane cation.

8. A pharmacologically acceptable salt of the 1,8-bis-(6,7-methylene dioxy - 2,3,3 - trimethyl - 3,4,dihydroisoquinol-1-ylium) octane cation.

9. A pharmacologically acceptable salt of the 1,8-bis-(2 - ethyl - 6,7-methylenedioxy-3,3-dimethyl-3,4-dihydroisoquinol-1-ylium)octane cation.

10. A pharmacologically acceptable salt of the 1,8-bis-(2 - allyl - 6,7 - dimethoxy-4,4-dimethyl-3,4-dihydroisoquinol-1-ylium)octane cation.

11. A pharmacologically acceptable salt of the 1,8-bis-(6,7-ethylenedioxy-2,3,3-trimethyl - 3,4 - dihydroisoquinol-1-ylium)octane cation.

12. A pharmacologically acceptable salt of the 1,8-bis-(5,8 - dimethoxy - 2,4,4-trimethyl-3,4-dihydroisoquinol-1-ylium)octane cation.

13. A compound according to claim 1 in which when R⁴ or R⁵ is hydrogen, R¹ and R² taken alone are selected from the class consisting of methyl, ethyl and R¹ and R² taken together with the carbon atom to which they are attached form a 1,1-divalent cyclopentane group, and when $R^1$ or $R^2$ is hydrogen, $R^4$ and $R^5$ are selected from the class consisting of methyl, ethyl and $R^4$ and $R^5$ taken together with the carbon atom to which they are attached form a 1,1-divalent cyclopentane group.

14. A compound according to claim 13 in which $n$ is selected from the class containing of 4, 8 and 9.

15. A compound according to claim 1 in which Z is methoxy.

16. A compound according to claim 1 in which $R^1$, $R^2$, $R^4$ or $R^5$ are hydrogen or lower alkyl and wherein at least two of $R^1$, $R^2$, $R^4$ and $R^5$ on the same carbon atom are always lower alkyl.

17. A compound according to claim 1 in which $R^1$, $R^2$, $R^4$ or $R^5$ are hydrogen or lower alkyl, provided when $R^1$ and $R^2$ are both hydrogen or one is hydrogen and the other is lower alkyl, $R^4$ and $R^5$ taken together with the carbon atom to which they are attached form a 1,1-divalent cyclopentane group and provided that when $R^4$ or $R^5$ are both hydrogen or one is hydrogen and the other is lower alkyl, $R^1$ and $R^2$ taken together with the carbon atom to which they are attached form a 1,1-divalent cyclopentane group.

References Cited

UNITED STATES PATENTS

| | | | |
|---|---|---|---|
| 2,659,728 | 11/1953 | Craig et al. | 260—289 X |
| 2,662,083 | 12/1953 | Eastland et al. | 260—286 |
| 2,744,901 | 5/1956 | Nabenhaver | 260—289 X |
| 3,138,600 | 6/1964 | Fancher et al. | 260—288 X |

DONALD G. DAUS, Primary Examiner

U.S. Cl. X.R.

260—288, 326.13, 340.3, 340.5, 465, 465.8, 562, 567.6, 591, 599, 613, 618, 690; 424—258